UNITED STATES PATENT OFFICE.

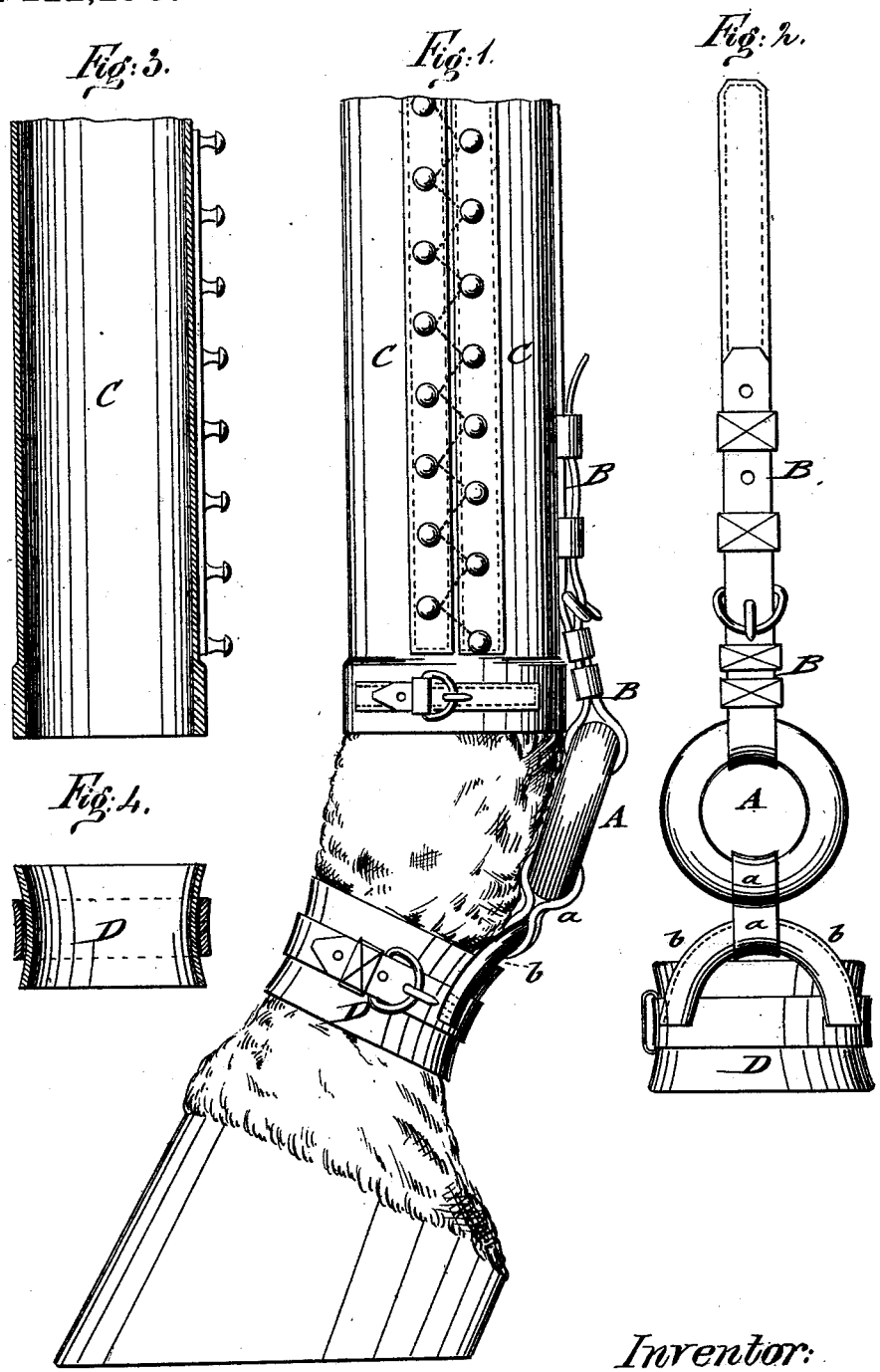

HANS LEHMANN AND AUREL BÖRENDT, OF HANOVER, PRUSSIA, GERMANY.

IMPROVEMENT IN APPLIANCES FOR PROTECTING THE FETLOCK-SINEWS OF HORSES.

Specification forming part of Letters Patent No. 222,290, dated December 2, 1879; application filed September 17, 1879.

*To all whom it may concern:*

Be it known that we, HANS LEHMANN and AUREL BÖRENDT, of the city of Hanover, in the Empire of Germany, have invented certain new and useful Improvements in Appliances for Protecting the Fetlock - Sinews of Horses, of which the following is a specification.

One of the most annoying incidents in keeping valuable horses is their breaking down by inflammation of the sinews. This is caused mainly by a too great strain exerted on the sinews, especially when the horse is fatigued or when it makes great efforts, either when training for a race or when trying to win a race at the last spurt, or in all cases when the horse is exposed to unaccustomed extra exertions.

This disadvantage we have aimed to overcome by providing an elastic support for the fetlock-sinews of the horse in such a manner that the same, when extended beyond a certain degree, find a ready and yielding support.

The object of this invention is more especially to apply to the fetlock-sinews of horses an improved protecting device by which over-exertion and straining are avoided; and the invention consists of an elastic ring cushion or supporter, that is placed back of the fetlock-sinew and connected by protecting devices to the leg above and below the fetlock.

In the accompanying drawings, Figure 1 represents a side view of a horse's foot with our improved fetlock-sinew protector; Fig. 2, a rear view of the same shown detached, and Figs. 3 and 4 are detail vertical central sections of the ring supporting sleeve and strap fastened above and below the fetlock.

Similar letters of reference indicate corresponding parts.

A in the drawings is an elastic supporter, made preferably of soft rubber, and of ring shape, which is placed in position back of the fetlock-sinew and secured to the foot of the horse at two points, one above, the other below, the fetlock, by connecting the ring A by a strap, B, with a gaiter or spatterdash, C, that is strapped and buckled to the leg above the fetlock, and by a leather band, $a$, with an eye, $b$, of a strap, D, which is buckled around the ankle.

By the upper and lower supports the elastic ring is held reliably in position on the fetlock in such a manner that the stretching of the ring can only take place when a considerable strain is exerted on the sinews. To secure this one of the front legs is held up and the supporter applied to the other foreleg, whose sinews are stretched to their full extent as the weight of the horse rests thereon. This mode of application secures the action of the ring only when a strain is exerted on the sinews greater than that exerted thereon when the horse rests on one of the forelegs. Were the protector placed on the leg while it is held up, it would be called into action at every step, and while standing, which is not required.

We have found by practical tests that the most advantageous form for the protector is that of a ring, as this shape gives free play to the sinew without in any way hindering, hurting, or cramping the same.

In place of the rubber, however, any desired elastic material may be used.

Any suitable devices for attaching the protector to the leg and ankle may be employed, as we do not bind ourselves to the exact construction shown.

Having thus described our invention, we claim as new and desire to secure by Letters Patent—

A fetlock-sinew protector for horses, consisting of an elastic ring cushion or supporter placed back of the fetlock-sinew, and of fastening devices applied above and below the fetlock to hold the supporter reliably in position on the fetlock, substantially as and for the purpose specified.

In testimony whereof we have signed our names to this specification in the presence of two subscribing witnesses.

HANS LEHMANN.
AUREL BÖRENDT.

Witnesses:
CARL FEHLERT,
BERTHOLD ROI.